US008826760B2

(12) United States Patent
Feldt et al.

(10) Patent No.: US 8,826,760 B2
(45) Date of Patent: Sep. 9, 2014

(54) AUTOMATIC TRANSMISSION HAVING HIGH PRESSURE ACTUATION AND LOW PRESSURE LUBE HYDRAULIC CIRCUIT

(75) Inventors: Keith Feldt, Wateford, MI (US); Melissa Koenig, Howell, MI (US); Christopher S. Vangorder, Ferndale, MI (US); Alexander Moser, Ketsch (DE)

(73) Assignee: BorgWarner Inc., Auburn Hills, MI (US)

(*) Notice: Subject to any disclaimer, the term of this patent is extended or adjusted under 35 U.S.C. 154(b) by 106 days.

(21) Appl. No.: 13/517,355

(22) PCT Filed: Dec. 23, 2010

(86) PCT No.: PCT/US2010/061958
§ 371 (c)(1),
(2), (4) Date: Jun. 20, 2012

(87) PCT Pub. No.: WO2011/082095
PCT Pub. Date: Jul. 7, 2011

(65) Prior Publication Data
US 2013/0112030 A1  May 9, 2013

Related U.S. Application Data

(60) Provisional application No. 61/291,423, filed on Dec. 31, 2009.

(51) Int. Cl.
*F16H 59/00* (2006.01)
*F16H 61/00* (2006.01)
*F16H 57/04* (2010.01)

(52) U.S. Cl.
CPC ........ *F16H 61/0009* (2013.01); *F16H 61/0021* (2013.01); *F16H 2061/0037* (2013.01); *F16H 57/0446* (2013.01)

USPC ............................................. 74/335; 74/733.1

(58) Field of Classification Search
USPC ............................... 74/330, 335, 732.1, 733.1
See application file for complete search history.

(56) References Cited

U.S. PATENT DOCUMENTS 1,233,561 A   7/1917   Dornfeld
2,174,395 A   9/1939   Aikman
(Continued)

FOREIGN PATENT DOCUMENTS

DE        871857       7/1949
DE        953406       11/1956
(Continued)

OTHER PUBLICATIONS

Aug. 4, 2011 International Search Report and Written Opinion for International App. No. PCT/US2010/061958.

*Primary Examiner* — Ha D Ho
(74) *Attorney, Agent, or Firm* — Howard & Howard Attorneys PLLC

(57) ABSTRACT

An automatic transmission having high pressure actuation and low pressure lube includes a hydraulic circuit (110) having a source of pressurized fluid (112), an actuation circuit (114) that delivers pressurized fluid to actuate components of the transmission, and a cooling circuit (116) used to cool components of the transmission. The source of pressurized fluid includes a motor 118, a first pump 120 operatively driven by the motor 118, and a second pump 122 selectively driven by motor 118. A clutch mechanism 124 is connected between the motor 118 and the second pump 122 so as to selectively engage and disengage the second pump 122 in driven relationship with the motor 118 so that the second pump 122 selectively supplies pressurized fluid to the cooling circuit 116 when the clutch mechanism 124 is engaged.

15 Claims, 2 Drawing Sheets

(56) References Cited

U.S. PATENT DOCUMENTS

| | | |
|---|---|---|
| 2,639,013 A | 5/1953 | Meschia |
| 2,919,778 A | 1/1960 | Aschauer |
| 2,943,502 A | 7/1960 | Perkins et al. |
| 3,040,408 A | 6/1962 | Schou |
| 3,171,522 A | 3/1965 | Petrie et al. |
| 3,313,385 A | 4/1967 | Förster |
| 3,362,481 A | 1/1968 | Steinhagen |
| 3,490,312 A | 1/1970 | Seitz et al. |
| 3,534,824 A | 10/1970 | Davison, Jr. |
| 3,537,556 A | 11/1970 | Pfeffer et al. |
| 3,589,483 A | 6/1971 | Smith |
| 3,612,237 A | 10/1971 | Honda |
| 3,654,692 A | 4/1972 | Goetz |
| 3,760,918 A | 9/1973 | Wetrich et al. |
| 3,823,801 A | 7/1974 | Arnold |
| 3,834,503 A | 9/1974 | Maurer et al. |
| 3,858,698 A | 1/1975 | Hause |
| 4,081,065 A | 3/1978 | Smyth et al. |
| 4,205,739 A | 6/1980 | Shelby et al. |
| 4,219,246 A | 8/1980 | Ladin |
| 4,270,647 A | 6/1981 | Leber |
| 4,301,904 A | 11/1981 | Ahlen |
| 4,361,060 A | 11/1982 | Smyth |
| 4,372,434 A | 2/1983 | Aschauer |
| 4,461,188 A | 7/1984 | Fisher |
| 4,476,748 A | 10/1984 | Morscheck |
| 4,501,676 A | 2/1985 | Moorhouse |
| 4,513,631 A | 4/1985 | Koivunen |
| 4,540,078 A | 9/1985 | Wetrich |
| 4,544,057 A | 10/1985 | Webster et al. |
| 4,548,306 A | 10/1985 | Hartz |
| 4,557,363 A | 12/1985 | Golan |
| 4,622,866 A | 11/1986 | Ito et al. |
| 4,627,312 A | 12/1986 | Fujieda et al. |
| 4,646,891 A | 3/1987 | Braun |
| 4,667,534 A | 5/1987 | Kataoka |
| 4,667,798 A | 5/1987 | Sailer et al. |
| 4,700,823 A | 10/1987 | Winckler |
| 4,713,980 A | 12/1987 | Ida et al. |
| 4,722,237 A | 2/1988 | McNinch, Jr. |
| 4,732,253 A | 3/1988 | Hiramatsu et al. |
| 4,753,332 A | 6/1988 | Bieber et al. |
| 4,802,564 A | 2/1989 | Stodt |
| 4,808,015 A | 2/1989 | Babcock |
| 4,813,234 A * | 3/1989 | Nikolaus ................ 60/484 |
| 4,827,784 A | 5/1989 | Muller et al. |
| 4,841,803 A | 6/1989 | Hamano et al. |
| 4,905,801 A | 3/1990 | Tezuka |
| 4,947,970 A | 8/1990 | Miller et al. |
| 4,957,016 A | 9/1990 | Amedei et al. |
| 5,050,714 A | 9/1991 | Kurihara et al. |
| 5,174,420 A | 12/1992 | DeWald et al. |
| 5,232,411 A | 8/1993 | Hayashi et al. |
| 5,259,476 A | 11/1993 | Matsuno et al. |
| 5,275,267 A | 1/1994 | Slicker |
| 5,284,232 A | 2/1994 | Prud'Homme |
| 5,305,863 A | 4/1994 | Gooch et al. |
| 5,383,544 A | 1/1995 | Patel |
| 5,439,088 A | 8/1995 | Michioka et al. |
| 5,444,623 A | 8/1995 | Genise |
| 5,445,043 A | 8/1995 | Eaton et al. |
| 5,450,934 A | 9/1995 | Maucher |
| 5,469,943 A | 11/1995 | Hill et al. |
| 5,495,927 A | 3/1996 | Samie et al. |
| 5,499,704 A | 3/1996 | Hays |
| 5,505,286 A | 4/1996 | Nash |
| 5,522,775 A | 6/1996 | Maruyama et al. |
| 5,538,121 A | 7/1996 | Hering |
| 5,577,588 A | 11/1996 | Raszkowski |
| 5,609,067 A | 3/1997 | Mitchell et al. |
| 5,613,588 A | 3/1997 | Vu |
| 5,630,773 A | 5/1997 | Slicker et al. |
| 5,634,541 A | 6/1997 | Maucher |
| 5,634,867 A | 6/1997 | Mack |
| 5,662,198 A | 9/1997 | Kojima et al. |
| 5,679,098 A | 10/1997 | Shepherd et al. |
| 5,711,409 A | 1/1998 | Murata |
| 5,720,203 A | 2/1998 | Honda et al. |
| 5,755,314 A | 5/1998 | Kanda et al. |
| 5,782,710 A | 7/1998 | Kosik et al. |
| 5,851,164 A | 12/1998 | Habuchi et al. |
| 5,890,392 A | 4/1999 | Ludanek et al. |
| 5,899,310 A | 5/1999 | Mizuta |
| 5,908,100 A | 6/1999 | Szadkowski et al. |
| 5,915,512 A | 6/1999 | Adamis et al. |
| 5,918,715 A | 7/1999 | Ruth et al. |
| 5,950,781 A | 9/1999 | Adamis et al. |
| 5,964,675 A | 10/1999 | Shimada et al. |
| 5,966,989 A | 10/1999 | Reed, Jr. et al. |
| 5,979,257 A | 11/1999 | Lawrie |
| 6,000,510 A | 12/1999 | Kirkwood et al. |
| 6,006,620 A | 12/1999 | Lawrie et al. |
| 6,012,561 A | 1/2000 | Reed, Jr. et al. |
| 6,026,944 A | 2/2000 | Satou et al. |
| 6,044,719 A | 4/2000 | Reed, Jr. et al. |
| 6,071,211 A | 6/2000 | Liu et al. |
| 6,116,397 A | 9/2000 | Kosumi et al. |
| 6,145,398 A | 11/2000 | Bansbach et al. |
| 6,164,149 A | 12/2000 | Ohmori et al. |
| 6,171,212 B1 | 1/2001 | Reuschel |
| 6,189,669 B1 | 2/2001 | Kremer et al. |
| 6,217,479 B1 | 4/2001 | Brown et al. |
| 6,244,407 B1 | 6/2001 | Kremer et al. |
| 6,269,293 B1 | 7/2001 | Correa et al. |
| 6,286,381 B1 | 9/2001 | Reed, Jr. et al. |
| 6,299,565 B1 | 10/2001 | Jain et al. |
| 6,364,809 B1 | 4/2002 | Cherry |
| 6,393,943 B1 | 5/2002 | Sommer et al. |
| 6,397,994 B1 * | 6/2002 | Bowen ................ 192/48.9 |
| 6,415,213 B1 | 7/2002 | Hubbard et al. |
| 6,419,062 B1 | 7/2002 | Crowe |
| 6,427,550 B1 * | 8/2002 | Bowen ................ 74/336 R |
| 6,435,049 B1 | 8/2002 | Janasek et al. |
| 6,463,821 B1 | 10/2002 | Reed, Jr. et al. |
| 6,523,657 B1 | 2/2003 | Kundermann et al. |
| 6,536,296 B2 | 3/2003 | Sakamoto et al. |
| 6,602,161 B2 | 8/2003 | Hemmingsen et al. |
| 6,615,966 B2 | 9/2003 | Kato |
| 6,626,056 B2 | 9/2003 | Albert et al. |
| 6,631,651 B2 | 10/2003 | Petrzik |
| 6,656,090 B2 | 12/2003 | Matsumura et al. |
| 6,669,596 B1 | 12/2003 | Sefcik |
| 6,695,748 B2 | 2/2004 | Kopec et al. |
| 6,715,597 B1 | 4/2004 | Buchanan et al. |
| 6,736,751 B1 | 5/2004 | Usoro et al. |
| 6,752,743 B2 | 6/2004 | Eich et al. |
| 6,789,658 B2 | 9/2004 | Busold et al. |
| 6,868,949 B2 | 3/2005 | Braford, Jr. |
| 6,869,382 B2 | 3/2005 | Leising et al. |
| 6,883,394 B2 | 4/2005 | Koenig et al. |
| 6,953,417 B2 | 10/2005 | Koenig |
| 7,311,187 B2 | 12/2007 | Koenig et al. |
| 7,318,512 B2 | 1/2008 | Bauer et al. |
| 2002/0014386 A1 | 2/2002 | Diemer et al. |
| 2002/0185351 A1 | 12/2002 | Berger et al. |
| 2003/0057051 A1 | 3/2003 | Alfredsson |
| 2003/0075413 A1 | 4/2003 | Alfredsson |
| 2003/0178275 A1 | 9/2003 | Breier et al. |
| 2004/0060378 A1 | 4/2004 | Yamamoto et al. |
| 2004/0060793 A1 | 4/2004 | Dacho et al. |
| 2004/0206599 A1 | 10/2004 | Hegerath |
| 2005/0000774 A1 | 1/2005 | Friedmann |
| 2005/0067251 A1 | 3/2005 | Braford, Jr. et al. |
| 2005/0279605 A1 | 12/2005 | Sowul et al. |
| 2006/0005647 A1 | 1/2006 | Braford et al. |
| 2006/0006042 A1 | 1/2006 | Koenig |
| 2006/0006043 A1 | 1/2006 | Koenig et al. |
| 2006/0009326 A1 | 1/2006 | Stefina |

(56) References Cited

U.S. PATENT DOCUMENTS

| | | |
|---|---|---|
| 2006/0150762 A1 | 7/2006 | Petrzik |
| 2007/0170031 A1 | 7/2007 | Kohlhaas et al. |

FOREIGN PATENT DOCUMENTS

| | | |
|---|---|---|
| DE | 1146314 | 3/1963 |
| DE | 1217800 | 5/1966 |
| DE | 3149880 C2 | 7/1982 |
| DE | 3118565 A1 | 11/1982 |
| DE | 3532759 C1 | 3/1987 |
| DE | 19700635 C2 | 8/1997 |
| DE | 10012122 A1 | 9/2000 |
| DE | 10034677 A1 | 2/2002 |
| DE | 10049474 A1 | 4/2002 |
| DE | 10118756 A1 | 5/2002 |
| DE | 10115454 A1 | 8/2002 |
| DE | 10156789 A1 | 8/2002 |
| DE | 10125172 A1 | 11/2002 |
| DE | 10143834 A1 | 3/2003 |
| EP | 0120617 A1 | 10/1984 |
| EP | 0762009 A1 | 3/1997 |
| EP | 0848179 A1 | 6/1998 |
| EP | 1195537 A1 | 4/2002 |
| EP | 1420185 A2 | 11/2003 |
| EP | 1531292 A2 | 11/2004 |
| EP | 1703178 A2 | 9/2006 |
| EP | 1614920 A1 | 11/2006 |
| EP | 1788288 A2 | 5/2007 |
| FR | 1246517 | 10/1960 |
| FR | 2123828 | 8/1972 |
| GB | 2036203 A | 6/1980 |
| GB | 2356438 A | 5/2001 |
| JP | 4366032 | 12/1992 |
| JP | 8200393 | 8/1996 |
| JP | 2005147403 | 6/2005 |
| WO | 2004005744 A1 | 1/2004 |
| WO | 2006086704 A2 | 8/2006 |
| WO | 2009128806 A1 | 10/2009 |

\* cited by examiner

AUTOMATIC TRANSMISSION HAVING HIGH PRESSURE ACTUATION AND LOW PRESSURE LUBE HYDRAULIC CIRCUIT

BACKGROUND OF THE INVENTION

1. Field of the Invention

The present invention relates, generally, to an automatic transmission and, more specifically, to an automatic transmission having high pressure actuation and low pressure lube hydraulic circuit.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Controlling and regulating transmissions to achieve the desired vehicle occupant comfort goals in an efficient and cost effective manner is a complicated matter. There are a large number of events to properly time and execute within the transmission for each shift to occur smoothly and efficiently. Furthermore, since the control of a majority of automatic transmissions is carried out by hydraulically actuating the various components within the transmission, it is important to provide a stable hydraulic pressure. Since hydraulically actuated devices respond in a predetermined and a precise manner for the given pressure supplied to actuate them, inaccurate control of the hydraulic pressure causes inaccurate operation and control of the transmission. Establishing and maintaining a stable hydraulic pressure in an automatic transmission can be problematic. As previously mentioned, a pump is employed to provide pressurized hydraulic fluid for the control and actuation of the transmission. In addition, the clutches and gear assemblies are lubricated and cooled by a secondary flow of hydraulic fluid. With conventional vehicles, the pump is mechanically driven by a power take-off from the engine. Thus, the hydraulic pressure delivered from the pump increases as the pump speed increases in response to an increase in engine speed.

One type of transmission known in the art has two clutches and is generally referred to simply as dual, or twin, clutch transmissions (DCTs). The dual clutch structure is most often coaxially and cooperatively configured to derive power input from a flywheel arrangement. However, some designs have a dual clutch assembly that is coaxial, but with the clutches located on opposite sides of the transmissions body and having different input sources. Regardless, dual clutch transmissions typically include one power transmission assembly on each of two input shafts concomitantly driving one output shaft. Each clutch and associated gear sets can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain dual clutch transmissions. These factors also make the dual clutch transmissions an attractive component for a hybrid engine.

While the automatic transmissions known in the related art have generally worked for their intended purposes, there remains a need in the art for such a transmission having a hydraulic circuit that is less complex and costly to manufacture than current systems available in the market. At the same time, there remains a need in the art for a transmission having a hydraulic circuit that is capable of quickly and efficiently providing pressurized hydraulic fluid for the control and actuation of the transmission as well as for cooling the various components of the transmission in a cost-effective manner.

SUMMARY OF THE INVENTION

The deficiencies of the related art are overcome in an automatic transmission having high pressure actuation and low pressure lube hydraulic circuits. Thus, the automatic transmission of the present invention has a hydraulic circuit with a source of pressurized fluid. The hydraulic circuit includes an actuation circuit that delivers pressurized fluid used to actuate components of the transmission and a cooling circuit that delivers pressurized fluid used to cool components of the transmission. The source of pressurized fluid includes an electrically powered motor. A first pump is operatively driven by the motor. A second pump is selectively driven by the motor. A clutch mechanism is operatively connected between the motor and the second pump so as to selectively engage and disengage the second pump in driven relationship with the motor. The first pump is operable to supply pressurized fluid to the actuation circuit and the cooling circuit when operatively driven by the motor. The second pump acts to selectively supply pressurized fluid to the cooling circuit when the clutch mechanism is engaged.

This arrangement allows the use of a smaller capacity first pump and may thereby reduces the cost of the transmission. In addition, the automatic transmission having the hydraulic circuit of the present invention also improves the efficiency of the overall system.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
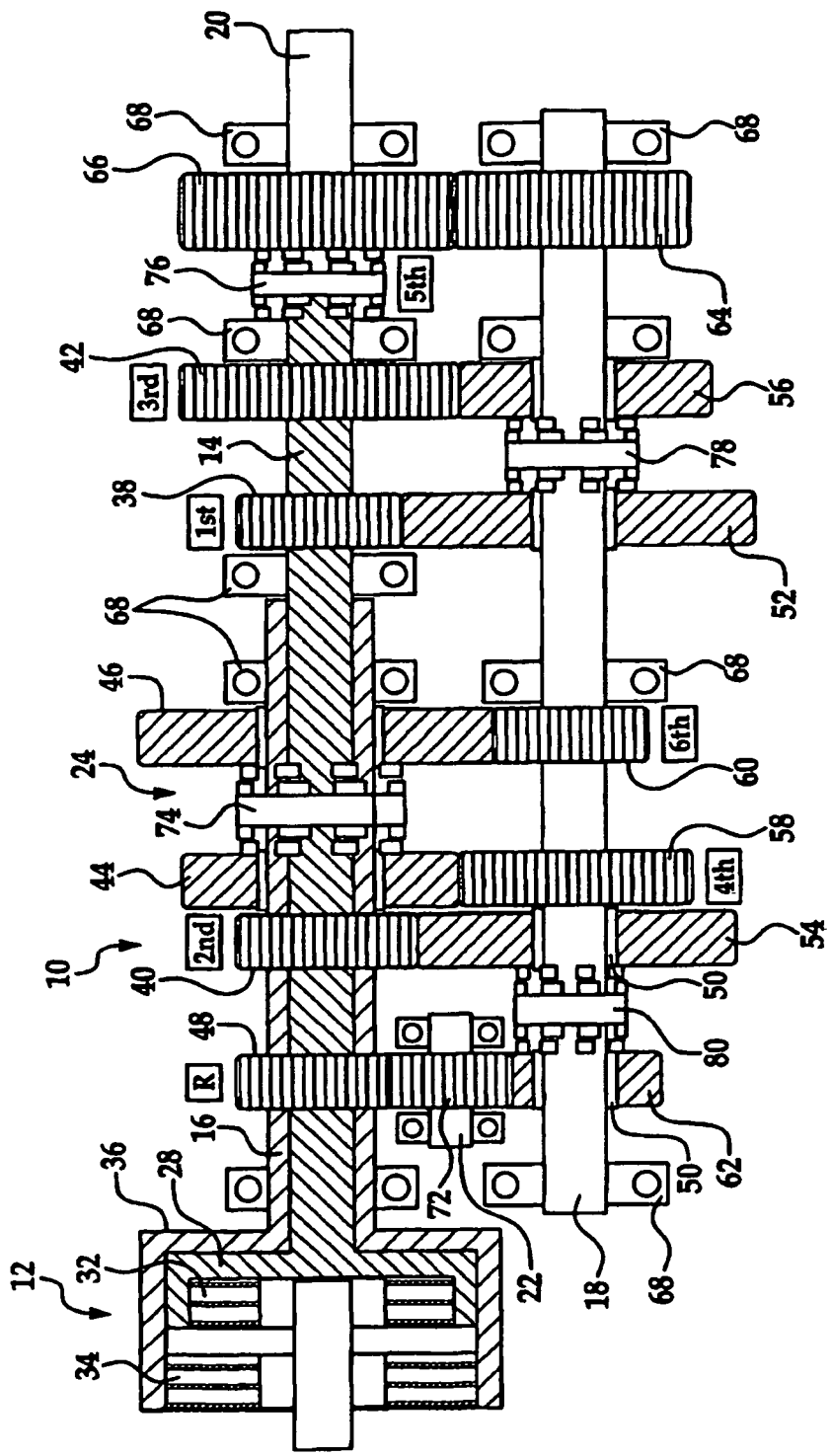
FIG. 1 is a schematic illustration of a representative example of a transmission of the type that may employ the hydraulic circuit of the present invention.

A representative example of an automatic transmission that may be employed for an automatic engine is generally indicated at 10 in FIG. 1. In this case, the automatic transmission described and illustrated herein is a dual clutch transmission. However, those having ordinary skill in the art will appreciate from the description that follows that the present invention may be employed in connection with any type of automatic transmission used for an automotive engine. In one relevant application, the automatic transmission may be employed in connection with a hybrid engine. Thus, those having ordinary skill in the art will understand that the present invention is defined by the claims set forth herein, rather than by the dual clutch transmission illustrated in FIG. 1 and described below. As illustrated in FIG. 1, the dual clutch transmission 10 may include a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24.

The dual clutch transmission 10 forms a portion of a vehicle powertrain and is responsible for taking a torque input from the power plant, such as an internal combustion engine or electrical motor in a hybrid engine, and transmitting the torque through selectable gear ratios to the vehicle drive wheels. The dual clutch transmission 10 operatively routes the applied torque from the power plant through the dual clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 (FIG. 2) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual clutch assembly 12 includes a first clutch mechanism 32 and a second clutch mechanism 34. The first clutch mechanism 32 is, in part, physically connected to a portion of a flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As shown in one embodiment illustrated in FIG. 1, the first and second clutch mechanisms 32, 34 are coaxial such that the outer case 28 of the first clutch mechanism 32 fits inside of the outer case 36 of the second clutch mechanism 34. Similarly, the first and second input shafts 14, 16 are also coaxial such that the second input shaft 16 is hollow having an inside diameter sufficient to allow the first input shaft 14 to pass through and be partially supported by the second input shaft 16. Notwithstanding the embodiment illustrated in FIG. 1, those having ordinary skill in the art will appreciate that the first and second clutch mechanisms 32, 34 may be physically arranged concentrically within the transmission, rather than the parallel structure illustrated in FIG. 1. Similarly, the first and second input shafts may be arranged in parallel relative to one another.

The first input shaft 14 includes a first input gear 38 and a third input gear 42. The first input shaft 14 is longer in length than the second input shaft 16 so that the first input gear 38 and a third input gear 42 are disposed adjacent to each other on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

It should be appreciated that this example of the dual clutch transmission is representative and that other gear set, synchronizer, and shift actuator arrangements are possible for the dual clutch transmission 10 without departing from the scope of the present invention.

It should be further appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. In any event, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions.

The first and second clutch mechanisms 32 and 34 of the dual clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as shown in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. This powershift changeover of the clutches 32 and 34 occurs for each shift change of the dual clutch transmission 10. As the inactive clutch (now the on-coming clutch) is engaged, the load applied causes a surge of power to be transferred across the clutch with an accompanying generation of heat from the slip that occurs across the clutch. The temperature of the on-coming clutch rapidly increases, or spikes, to a point where the clutch plates or the friction material could be damaged if proper cooling is not provided. Additionally, the heat build-up, if not properly dissipated, will greatly increase the overall temperature of the dual clutch transmission 10 and may cause the damaging effects mentioned above. Simultaneously, while the temperature of the on-coming clutch is sharply rising, the disengaging, or off-going, clutch will cease transmitting torque. With the removal of the load, the disengaged clutch will stop generating heat, thus sharply lowering its cooling requirement.

Figure 2:
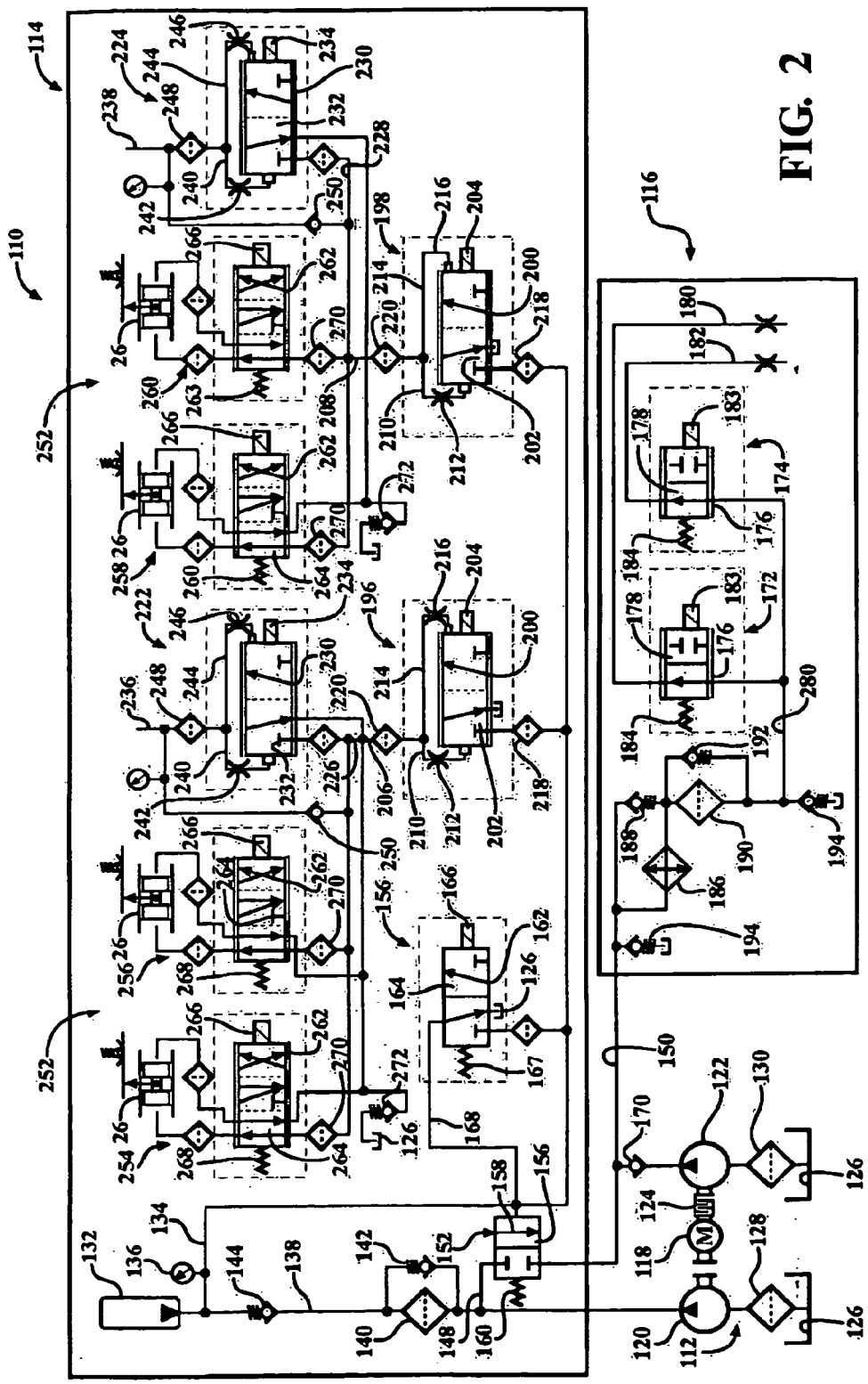
FIG. 2 is a schematic diagram of a representative hydraulic circuit of the present invention.

A hydraulic circuit for controlling and cooling the clutches 32, 34 of the dual clutch transmission is generally indicated at 110 in FIG. 2, where like numerals are used to designate like components throughout the figures. The hydraulic circuit 110 includes a source of pressurized cooling fluid, generally indicated at 112. In addition, the hydraulic circuit 110 includes an actuation circuit, generally indicated at 114, that delivers pressurized fluid used to actuate components of the dual clutch transmission, such as the clutches 32, 34 as well as similar components. The hydraulic circuit 110 also includes a cooling circuit, generally indicated at 116, that delivers pressurized fluid used to lubricate and cool components of the dual clutch transmission such as the clutches 32, 34 and the gears described above.

The source of pressurized fluid 112 includes a motor 118. In one embodiment, it may be an electrically powered motor 118. A first pump 120 is operatively driven by the motor 118. A second pump 122 is selectively driven by the motor 118. A clutch mechanism, generally indicated at 124, is operatively connected between the motor 118 and the second pump 122 to selectively engage and disengage the second pump 122 in driven relationship with the motor 118 as will be described in greater detail below. In one embodiment, the clutch mechanism 124 may include a multi-disk friction clutch that is electrically actuated to couple the electric motor 118 and the second pump 122 together. However, those having ordinary skill in the art will appreciate that any clutch suitable for this purpose will suffice. The first and second pumps 120, 122 draw cooling fluid from a sump 126 through respective filters 128, 130. However, those having ordinary skill in the art will appreciate that a single filter may be employed with both pumps. The first pump 120 is operable to supply pressurized fluid to the actuation circuit 114 and the cooling circuit 116 when driven by the motor 118. The second pump 122 acts to selectively supply pressurized fluid to the cooling circuit 116 when the clutch mechanism 124 is engaged.

The actuation circuit 114 includes an accumulator 132 disposed in fluid communication with the first pump 120. The accumulator 132 acts to store pressurized fluid and to supply pressurized fluid to the actuation circuit 114 via the main supply line 134, under predetermined conditions. A sensor 136 is disposed downstream from the accumulator 132 to monitor the pressure of the fluid in the hydraulic circuit 110. The accumulator 132 may generate sufficient system pressure via a piston or compressed gas contained within the accumulator. Thus, those having ordinary skill in the art will appreciate that the accumulator 132 can have any suitable structure sufficient to supply fluid at a predetermined pressure. Pressurized fluid is provided to the accumulator 132 via the delivery line 138. A filter 140 having a bypass check valve 142 is disposed on the delivery line 138 between the first pump 120 and the accumulator 132. In addition, an accumulator check valve 144 is disposed between the filter 140 and the accumulator 132 in order to prevent reverse flow back to the pump.

The hydraulic circuit 110 also includes a lube switch circuit, generally indicated at 146, which is disposed in fluid communication with the first pump 120 via line 148 and the cooling circuit 116 via lube feed line 150. The lube switch circuit 146 is operable to supply pressurized fluid from the first pump 120 to the cooling circuit 116 under predetermined conditions as will be described in greater detail below.

More specifically, the lube switch circuit 146 includes a lube switch valve, generally indicated at 152, and a lube switch control solenoid valve, generally indicate at 154. As noted above, the lube switch valve 152 is disposed in fluid communication with the first pump 120 via line 148 and the cooling circuit 116 via the lube feed line 150. The lube switch valve 152 is operable in response to commands from the lube switch solenoid valve 154 to direct pressurized fluid to the cooling circuit 116 under certain predetermined conditions. To this end, the lube switch valve 152 includes a valve body 156 and a valve member 158 moveably supported in the valve body 156 to provide flow of cooling fluid to the cooling circuit 116 via the lube feed line 150. A biasing member 160 acts on the valve member 158 to bias it to its normally closed position.

Similarly, the lube switch control solenoid valve 154 includes a valve body 162, a valve member 164 moveably supported in the valve body 162 and a solenoid 166. The solenoid 166 is adapted to move the valve member 164 of the lube switch control solenoid valve 154 to produce a control signal pressure to the valve member 158 of the lube switch valve 152 via control line 168 to move the valve member 158 against the bias of the biasing member 160 to selectively open the lube switch valve 152 thereby delivering a controlled pressurized amount of cooling fluid from the first pump 120 to the cooling circuit 116. A biasing member 167 is used to bias the valve member 164 against the force generated by solenoid 166. On the other hand, the electric motor 118 selectively drives the second pump 122 when the clutch mechanism 124 is engaged to provide cooling fluid to the cooling circuit 116 via the lube feed line 150. A check valve 170 is disposed downstream of the second pump 122 and between the second pump 122 and the lube feed line 150. The second pump 122 may be employed in this way during, for example, vehicle launch; while the vehicle is travelling up a hill; or any time when there is an increase in power demand on the clutches. At the same time, and because of the availability of the second pump 122, the size of the first pump 120 may be reduced. The second pump 122 is typically not employed during steady state operations of the automatic transmission.

The cooling circuit includes first and second clutch lube valves, generally indicated at 172 and 174 that are in fluid communication with the source of pressurized fluid 112 via the lube feed line 150. The first and second clutch lube valves 172, 174 are adapted to control the flow of pressurized fluid to the clutches 32, 34, respectively, of the transmission. To this end, the first and second clutch lube valves 172, 174 include a valve body 176 and a valve member 178 moveably supported in the valve body 176 to provide a flow of cooling fluid to the clutches 32, 34 of the transmission through lube delivery lines 180, 182, respectively. The lube valves 172, 174 each include a solenoid 183 and biasing member 184 that acts on the valve member 178 to bias it to its normally closed position. A cooler 186 having a cooler bypass valve 188 is disposed between the first and second clutch lithe valves 172, 174 and in fluid communication with the source of pressurized fluid 112. Similarly, a filter 190 having a bypass valve 192 is disposed between and in fluid communication with the cooler 186 and the first and second clutch lube valves 172, 174. The cooling circuit 116 may have one or more pump relief valves 194 strategically disposed therein, although the specific number and location of the relief valves is generally a matter of engineering expediency. While one embodiment of a cooling circuit has been disclosed herein, those having ordinary skill in the art will appreciate that this circuit may be arranged in different fashions so as to provide adequate lube without departing from the scope of the present invention.

As noted above, the main supply line 134 provides pressurized fluid to the actuation circuit 114. Flow of pressurized fluid in the actuation circuit 114 is controlled by first and second axis feed valves 196, 198. The axis feed valves 196, 198 regulate the pressure of each axis in the actuation circuit 114. To this end, each of the first and second actuation feed valves 196, 198 includes a valve body 200, a valve member 202 moveably supported within the valve body 200 and a solenoid 204. The solenoid 204 is adapted to move the valve member 202 to produce a flow area through the axis feed valve to deliver a predetermined amount of pressurized fluid to each axis of the actuation circuit 114 through delivery lines 206 and 208, respectively. The first and second axis feed valves 196, 198 are controlled by the ECU to selectively provide a predetermined pressure in the actuation circuit 114. A valve return line 210 provides a biasing force through a flow restrictor 212 in a direction opposite to the actuation of the solenoid 204. Similarly, a valve balance line 214 provides additional force through a flow restrictor 216 on the solenoid side of the valve member 202. Each of the axis feed valves 196, 198 include an upstream filter 218 as well as an output filter 220 disposed downstream of the valve 196, 198. In their non-operative mode, each of the axis feed valves 196, 198 returns any pressurized fluid to the sump 126. Each of the first and second axis feed valves 196, 198 is shown in its non-operative position in FIG. 2.

The actuation circuit 114 also includes first and second clutch actuation valves 222, 224 disposed in fluid communication with the source of pressurized fluid 112 via lines 226, 228 and a corresponding one of the pair of clutches 32, 34, respectively. Each of the pair of first and second clutch actuation valves 222, 224 is operable to provide pressurized fluid to each of the corresponding one of the pair of clutches to actuate same. To this end, the actuation circuit 114 supplies the first and second clutch actuation valves 222, 224 from their respective first and second axis feed valves 196, 198. Each of the first and second clutch actuation valves 222, 224 includes a valve body 230, a valve member 232 moveably supported within the valve body 230 and a solenoid 234. The solenoid 234 is adapted to move the valve member 232 to produce a flow area through the clutch actuation valves 222, 224 to delivered a predetermined amount of pressurized fluid to each of the clutches 32, 34 through delivery lines 236, 238, respectively, thereby selectively actuating same. The first and second clutch actuation valves 222, 224 are controlled by the ECU to selectively engage and disengage the respective clutch. A valve return line 240 provides a biasing force through a flow restrictor 242 in a direction opposite to the actuation of the solenoid 234. Similarly, a valve balance line 244 provides additional force through a flow restrictor 246 on the solenoid side of the valve member 232. Each of the first and second clutch actuation valves 222, 224 also includes an output filter 248 and a relief valve 250 downstream of the clutch actuation valves 222, 224 and in advance of the clutches to provide a maximum upper limit for the pressure supply to actuate the clutches. Thus, the relief valve 250 provides a secondary path for the clutch oil to exhaust in the event that the clutch actuation valves 222, 224 fail to open. In their non-operative mode, each of the first and second clutch actuation valves 222, 224 returns any pressurized fluid to the sump 126. Each of the first and second clutch actuation valves 222, 224 is shown in its non-operative position in FIG. 2.

The actuator circuit 114 also includes a shift actuation system, generally indicated at 252, that is disposed in fluid communication with the source of pressurized fluid 112 and acts to selectively provide fluid power to the shift actuators 26 so as to actuate the synchronizers 24 and select a designated gear among the plurality of gears. To this end, the shift actuation system 252 includes shift actuator valves 254, 256, 258, and 260 that are disposed in fluid communication with the axis feed valves 196, 198. Each of the shift actuator valves includes a valve member that is operable to direct pressurized fluid to opposite sides of the shift actuators 26 to select predetermined pairs of adjacent gears among the plurality of gears to which the pressurized fluid is delivered from the shift actuator valves. To this end, each of the shift actuator valves includes a valve body 262 and a valve member 264 moveably supported in the valve body 262, and the solenoid 266. The solenoid 266 is adapted to move the valve member 264 of the associated shift actuator valve to deliver a predetermined amount of pressurized fluids through the shift actuator 26 to move a predetermined shift actuator 26 and an associated synchronizer 24 to select a predetermined gear among the plurality of gears of the dual clutch transmission. A biasing member 268, such as a spring, functions to oppose the movement of the solenoid 266. The pressurized fluid delivered to each of the shift actuator valves 254, 256, 258, 260 through the respective axis feed valves 196, 198 are filtered at 270. Exhaust valves 272 are associated with shift actuator valves when the disposed in their non-operative position as shown in FIG. 2.

In operation, pressurized cooling fluid is provided to the actuation circuit 114 and the cooling circuit 116 by the first and second pumps 120, 122. When the motor 118 is running, it drives the first pump 120. Under this operating condition, pressurized fluid is provided to the accumulator 132 via delivery line 138. The accumulator 132 sets the system pressure in the hydraulic circuit 110. Pressurized fluid is provided to the actuation circuit 114 through the main supply line 134. The main supply line 134 supplies pressurized fluid to the first and second clutch actuation valves 222, 224 as well as the shift actuation system 122 via the axis feed valves 196, 198.

The first pump 120 may also supply pressurized fluid to the cooling circuit 116. In this case, pressurized fluid flows from the first pump 120 and into the cooling circuit 116 via the valve switch circuit 146. More specifically, pressurized cooling fluid flows through line 148 and through the lube switch valve 152 which, in turn, is controlled by the lube switch control solenoid valve 154. When the lube switch circuit 146 is actuated, pressurized cooling fluid may be supplied via the first pump 120 to the cooling circuit 116 via the lube switch circuit 146.

Under conditions of low speed, but high heat, the pressure in the cooling circuit 116 may drop below a predetermined value, such as five bars. When the fluid pressure in the cooling circuit 116 drops below a predetermined value, the hydraulic circuit 110 of the present invention is designed to use the second pump 122 to assist the first pump 120 to provide pressurized fluid to the cooling circuit 116. More specifically, when so commanded, the second pump 122 may be driven by the motor 118 via the clutch 124 to supply pressurized fluid to the cooling circuit 116. Thus, when the pressure in the cooling circuit 116 is below a predetermined value, the check valve 170 will unseat in response to fluid pressure delivered by the second pump 122. Cooling fluid will then flow through lube feed line 150 to the first and second clutch lube valves 172, 174 via line 240 via the joint schematically illustrated at 272. Cooling fluid will also flow into the cooler bypass 280.

Thus, the automatic transmission of the present invention is configured such that both the first and second pumps 120, 122 may be operable to supply pressurized fluid to the hydraulic circuit when necessary. This may occur, as explained in greater detail above, when the pressure delivered to the cooling circuit 116 drops below a predetermined value. In this case, the second pump 122 driven by the motor 118 via clutch 124 assists the first pump 120 to provide cooling fluid to the cooling circuit 116. This arrangement allows for the use of a smaller capacity first pump 120 and may thereby reduce the cost of the transmission.

It should also be appreciated that other routing arrangements may also be employed without departing from the scope of the present invention.

The invention has been described in an illustrative manner. It is to be understood that the terminology that has been used is intended to be in the nature of words of description rather than of limitation. Many modifications and variations of the invention are possible in light of the above teachings. Therefore, within the scope of the claims, the invention may be practiced other than as specifically described.

We claim:

1. An automatic transmission having high pressure actuation and low pressure lube hydraulic circuit, said transmission comprising:
a hydraulic circuit (110) having a source of pressurized fluid (112), said hydraulic circuit including an actuation circuit (114) that delivers pressurized fluid used to actuate components of said transmission and a cooling circuit (116) that delivers pressurized fluid used to cool components of said transmission;
said source of pressurized fluid (112) including an electrically powered motor 118, a first pump (120) operatively driven by said motor, a second pump (122) selectively driven by said motor (118), and a clutch mechanism (124) operatively connected between said motor (118) and said second pump (122) so as to selectively engage and disengage said second pump (122) in driven relationship with said motor;
said first pump (120) operable to supply pressurized fluid to said actuator circuit (114) and said cooling circuit (116) when operatively driven by said motor (118); and
said second pump (122) acting to selectively supply pressurized fluid to said cooling circuit (116) when said clutch mechanism (124) is engaged.

2. An automatic transmission as set forth in claim 1 wherein said actuation circuit includes an accumulator (132) in fluid communication with said first pump (120), said accumulator (132) acting to store pressurized fluid and to supply said pressurized fluid to said actuation circuit (114) under predetermined conditions.

3. An automatic transmission as set forth in claim 1 wherein said hydraulic circuit (110) further includes a lube switch circuit (146) disposed in fluid communication with said first pump (120) and said cooling circuit (116), said lube switch circuit (146) operable to supply pressurized fluid from said first pump (120) to said cooling circuit (116) under predetermined conditions.

4. An automatic transmission as set forth in claim 3 wherein said lube switch circuit (146) includes a lube switch valve (152) and a lube switch control solenoid valve (154), said lube switch valve (152) disposed in fluid communication with said first pump (120) and said cooling circuit (116) and operable in response to commands from said lube switch solenoid valve (154) to direct pressurized fluid to said cooling circuit.

5. An automatic transmission as set forth in claim 1 wherein said cooling circuit (116) includes first and second clutch lube valves (172, 174) in fluid communication with said source of pressurized fluid (112) and adapted to control the flow of pressurized fluid to the clutches of said transmission.

6. An automatic transmission as set forth in claim 1 wherein said transmission includes a pair of clutches (32, 34) operatively interconnecting a power plant to first and second input shafts (14, 16), said actuation circuit (114) including first and second clutch actuation valves (222, 224) in fluid communication with said source of pressurized fluid (112) and a corresponding one of said pair of clutches (32, 34), each of said pair of first and second clutch actuation valves (222, 224) operable to provide pressurized fluid to each of a corresponding one of said pair of clutches to actuate same.

7. An automatic transmission as set forth in claim 6 further including a plurality of gears operatively supported on said first and second input shafts (14, 16) and adapted to transmit torque at different ratios through said transmission, a plurality of synchronizers (24) associated with adjacent pair of gears and a plurality of shift actuators (26) for actuating said synchronizers to select between adjacent gears, said actuator circuit (114) further including a shift actuation system (252) in fluid communication with said source of pressurized fluid (112) and acting to selectively provide fluid power to said shift actuators (26) so as to actuate said synchronizers and select a designated gear among said plurality of gears.

8. An automatic transmission as set forth in claim 7 wherein said shift actuation system (252) includes shift actuator valves (254, 256, 258, 260) in fluid communication with said source of pressurized fluid, each of said shift actuator valves (254, 256, 258, 260) includes a valve member (264) that is operable to direct pressurized fluid to opposite sides of said shift actuators (26) to select predetermined pair of adjacent gears among said plurality of gears to which said pressurized fluid is delivered from said shift actuator valves (254, 256, 258, 260).

9. An automatic transmission as set forth in claim 8 further including first and second axis feed valves (196, 198) in fluid communication with said shift actuator valves (254, 256, 258, 260), each of said first and second axis feed valves (196, 198) in fluid communication with said source of pressurized fluid (112) and including a valve body (208), a valve member (202) movably supported in said valve body (200), and a solenoid (204), said solenoid (204) adapted to move said valve member (202) of said associated first and second axis feed valves (196, 198) to deliver a controlled predetermined amount of pressurized fluid through said shift actuator valves (254, 256, 258, 260) to move a predetermined shift actuator (26) and an associated synchronizer (24) to select a predetermined gear among the plurality of gears of said automatic transmission.

10. An automatic transmission for a vehicle having a power plant, said transmission comprising:
a pair of clutches (32, 34) operatively interconnecting the power plant to first and second input shafts (14, 16);
a hydraulic circuit (110) having a source of pressurized fluid (112), said hydraulic circuit including an actuation circuit (114) that delivers pressurized fluid used to actuate components of said transmission and a cooling circuit (116) that delivers pressurized fluid used to cool components of said transmission;
said source of pressurized fluid (112) including a motor (118), a first pump (120) operatively driven by said motor (118), a second pump (122) selectively driven by said motor (118), and a clutch mechanism (124) operatively connected between said motor (118) and said second pump (122) so as to selectively engage and disengage said second pump (122) in driven relationship with said motor (118);
said first pump (120) operable to supply pressurized fluid to said actuator circuit (114) and said cooling circuit (116) when operatively driven by said motor (118); and
said second pump (122) acting to selectively supply pressurized fluid to said cooling circuit (116) when said clutch mechanism (124) is engaged.

11. An automatic transmission as set forth in claim 10 wherein said actuation circuit (114) includes an accumulator (132) in fluid communication with said first pump (120), said accumulator (132) acting to store pressurized fluid and to supply said pressurized fluid to said actuation circuit (114) under predetermined conditions.

12. An automatic transmission as set forth in claim 10 wherein said hydraulic circuit (110) further includes a lube switch circuit (146) disposed in fluid communication with said first pump (120) and said cooling circuit (116), said lube switch circuit (116) operable to supply pressurized fluid from said first pump (120) to said cooling circuit (116) under predetermined conditions.

13. An automatic transmission as set forth in claim 12 wherein said lube switch circuit (146) includes a lube switch valve (152) and a lube switch control solenoid valve (154), said lube switch valve (152) disposed in fluid communication with said first pump (120) and said cooling circuit (116) and operable in response to commands from said lube switch solenoid valve (154) to direct pressurized fluid to said cooling circuit (116).

14. An automatic transmission as set forth in claim 10 wherein said cooling circuit (116) includes first and second clutch lube valves (172, 174) in fluid communication with said source of pressurized fluid (112) and adapted to control the flow of pressurized fluid to said clutches of said transmission.

15. An automatic transmission as set forth in claim 10 wherein said actuation circuit (114) includes first and second clutch actuation valves (222, 224) in fluid communication with said source of pressurized fluid (112) and a corresponding one of said pair of clutches (32, 34), each of said pair of first and second clutch actuation valves (222, 224) operable to provide pressurized fluid to each of a corresponding one of said pair of clutches to actuate same.

* * * * *

UNITED STATES PATENT AND TRADEMARK OFFICE
CERTIFICATE OF CORRECTION

PATENT NO. : 8,826,760 B2  Page 1 of 1
APPLICATION NO. : 13/517355
DATED : September 9, 2014
INVENTOR(S) : Keith Feldt et al.

It is certified that error appears in the above-identified patent and that said Letters Patent is hereby corrected as shown below:

Title Page, Item (75) Inventors: delete "Wateford" and insert therefor --Waterford--.

In the Claims

Column 10, line 12 (Claim 1) delete "118" and insert therefor --(118)--.

Signed and Sealed this
Fifth Day of April, 2016

Michelle K. Lee
*Director of the United States Patent and Trademark Office*